United States Patent [19]

Tanaka et al.

[11] 4,334,175
[45] Jun. 8, 1982

[54] DIGITAL SPEED CONTROL METHOD AND APPARATUS

[75] Inventors: Hiroichiro Tanaka, Kunitachi; Yasuo Nagatani, Tokyo, both of Japan

[73] Assignee: Tokyo Shibaura Denki Kabushiki Kaisha, Kanagawa, Japan

[21] Appl. No.: 53,271

[22] Filed: Jun. 29, 1979

[30] Foreign Application Priority Data

Jul. 3, 1978 [JP] Japan .................................. 53/79758

[51] Int. Cl.³ .............................................. H02P 5/46
[52] U.S. Cl. ........................................ 318/66; 318/67; 318/68; 318/69; 318/72
[58] Field of Search ......................... 318/66, 67, 68, 69, 318/72, 112.5, 49, 51, 59, 600, 604, 625, 685

[56] References Cited

U.S. PATENT DOCUMENTS

| | | | |
|---|---|---|---|
| 3,447,050 | 5/1969 | Geis | 318/67 |
| 3,585,470 | 6/1971 | Conners | 318/67 |
| 3,728,596 | 4/1973 | Hermansson et al. | 318/72 X |
| 4,051,415 | 9/1977 | Martin | 318/72 X |
| 4,196,785 | 4/1980 | Downing | 318/68 X |

*Primary Examiner*—Ulysses Weldon
*Attorney, Agent, or Firm*—Stevens, Davis, Miller & Mosher

[57] ABSTRACT

In a speed control method for digitally controlling the speeds of motors in a sectional drive system including the steps of setting a speed difference of each section with respect to a line speed reference, the speed difference set value is varied by pressing a push button switch and varying the speed difference set value by a unit value every unit operation time when the button switch is pressed.

5 Claims, 6 Drawing Figures

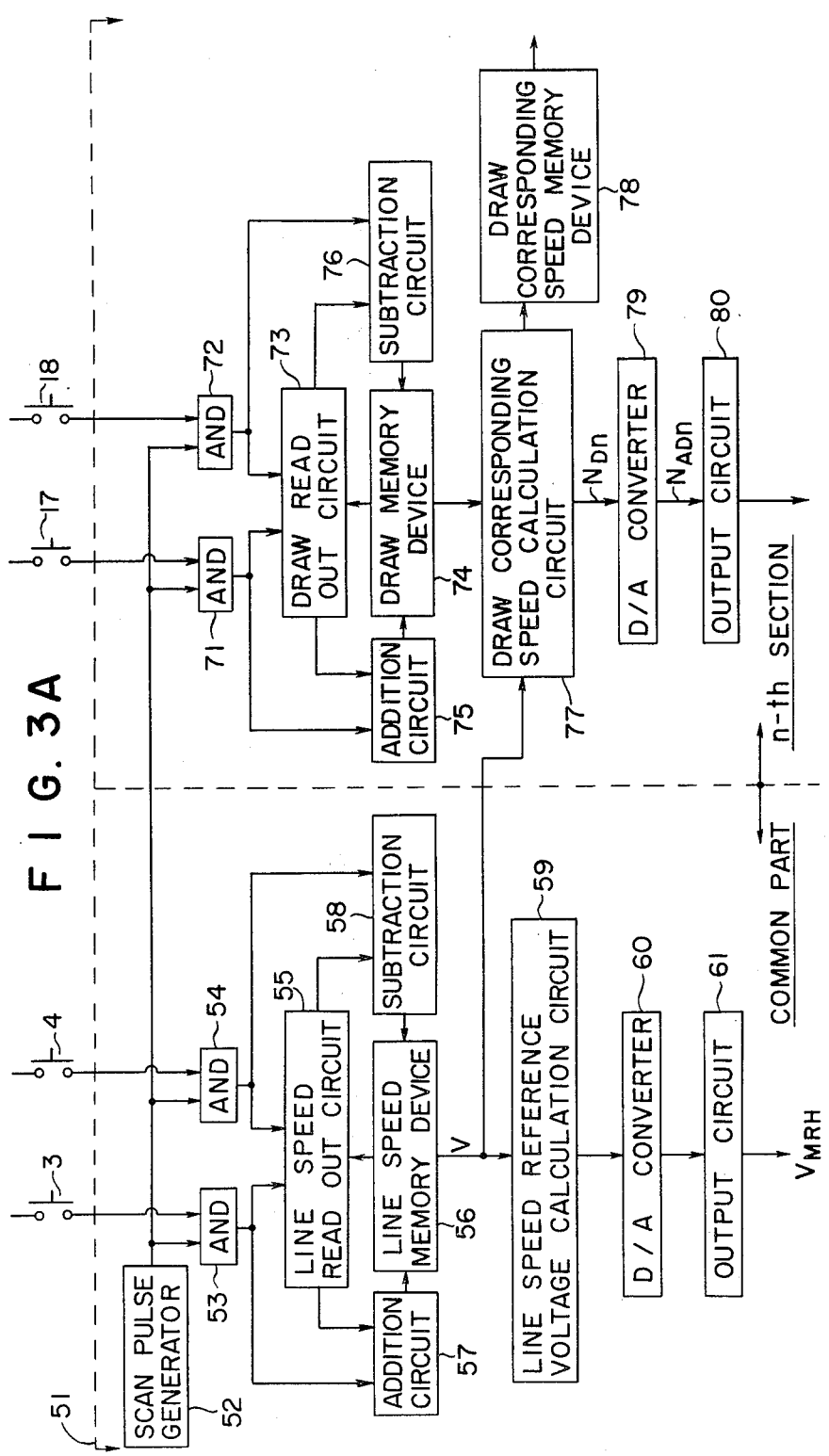

DIGITAL SPEED CONTROL METHOD AND APPARATUS

BACKGROUND OF THE INVENTION

The present invention relates to a digital speed control method which is particularly useful for controlling the speeds of motors used in a sectional drive system of a continuous processing line.

In certain types of sectional drive systems of a continuous processing line, such as a paper making machine, the motors of respective sections need to be operated in such a manner that there are precisely controlled differences, or draws, between the speeds of the motors, in order to maintain the quality of the products. Also it is desirable that the control system enables monitoring of the draws. Speed control systems used for these purposes are often called draw control systems.

To meet such requirements, it is known to use a proportional control as a minor loop and an integration control in an outer loop. A separate monitoring device has been employed to monitor the draws. Prior art systems are not sufficiently reliable and are bulky, as will be fully described later.

SUMMARY OF THE INVENTION

An object of the invention is to improve the reliability of speed control in a sectional drive system.

Another object of the invention is to reduce the size of the apparatus for carrying out speed control in a sectional drive system.

According to the invention, there is provided a speed control method for digitally controlling the speeds of a plurality of motors provided in respective sections in correlation with each other, including the steps of:

(a) setting a line speed reference, (b) setting a speed difference of each section with respect to the line speed reference, (c) detecting, every predetermined sampling period, the actual section speed of each section, (d) calculating a deviation in accordance with the line speed reference, the speed difference set value, and the actual section speed, and (e) controlling the speed of the motor of each section in accordance with the deviation calculated at the step (d), characterized in that the step (b) of setting a speed difference comprises the steps of:

(b1) operating a manually operable switch for varying the speed difference set value of each section, and (b2) varying the speed difference set value by a unit value every unit operation time when the manually operable switch is operated.

DESCRIPTION OF THE DRAWINGS

In the accompanying drawings,

FIGS. 3A and 3B are block diagrams showing the internal circuitry of the computer shown in FIG. 2, and FIGS. 4A and 4B are flow charts showing a sequence of procedures according to the invention.

DESCRIPTION OF THE EMBODIMENTS

Figure 1:
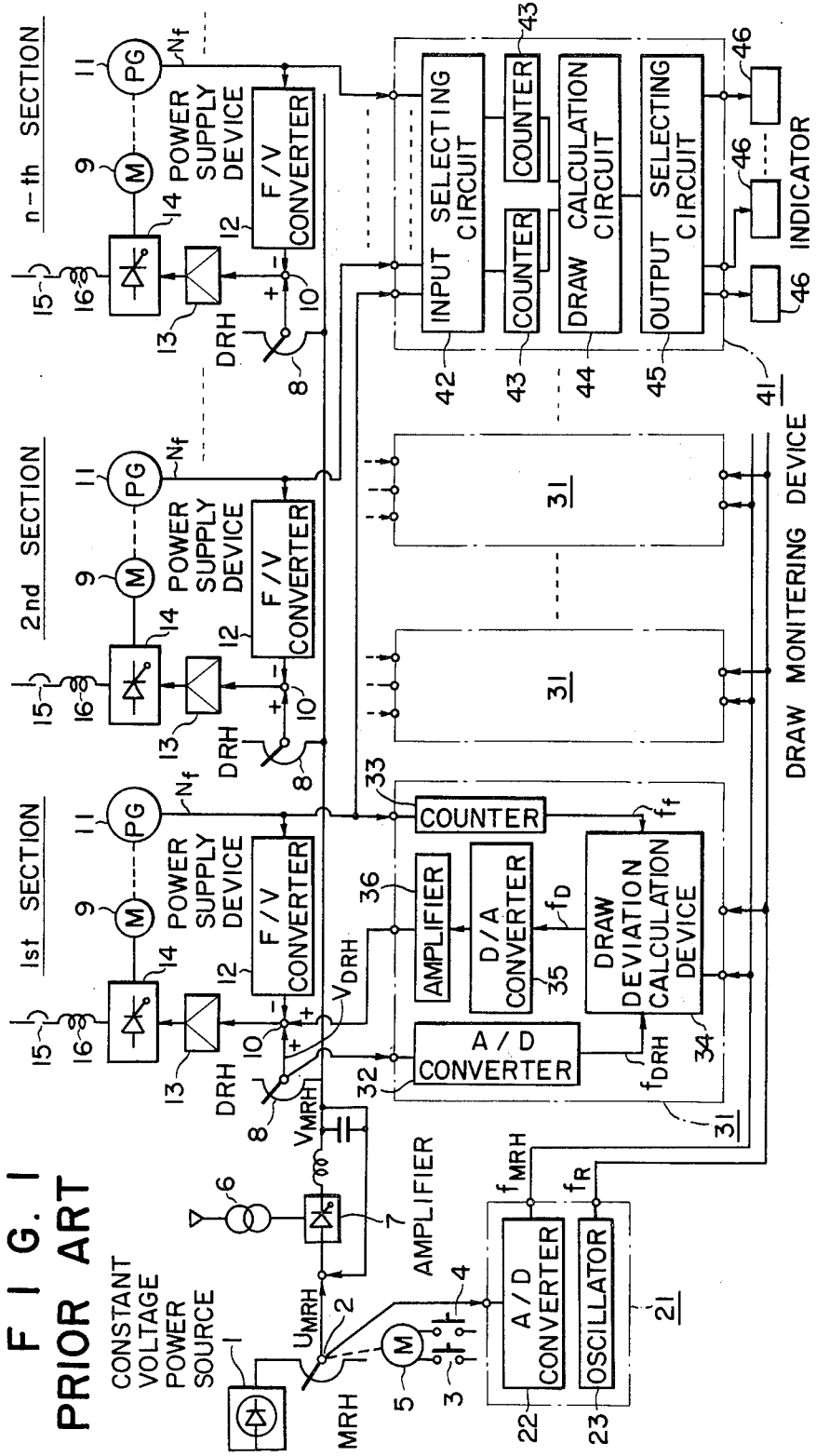
FIG. 1 is a block diagram showing a conventional speed control system.

Referring more particularly to FIG. 1, there is shown a typical one of draw monitoring and control system, which has been used for controlling the speeds of the motors in a paper making machine.

A constant-voltage power source 1 provides a constant voltage. A line speed reference setting device, in the form of a voltage divider 2 divides the constant voltage from the power source 1 and provides a divided voltage as a line speed reference setting voltage $U_{MRH}$. A line speed increase push button switch 3 and a line speed decrease push button switch 4 are used to vary the magnitude of the line speed reference setting voltage by means of an operating motor 5. A transformer 6 transforms the inputted A.C. voltage to a suitable level. An amplifier 7 is powered by the A.C. voltage from the transformer 6 and amplifies the line speed reference setting voltage $U_{MRH}$ to produce a line speed reference voltage $V_{MRH}$.

Each of the sections is provided with a variable-speed electric motor 9 and a section speed reference setting device in the form of a voltage divider 8 which divides the line speed reference voltage $V_{MRH}$ to produce a section speed reference voltage for the motor 9 of the section. Thus, the draws (speed differences) between the sections are indirectly controlled through separate control of the speed of the motor of each section.

A speed detector in the form of a pulse generator 11 is mechanically coupled with the motor 9 and generates electrical pulses whose frequency is proportional to the speed of the motor 9. A frequency-voltage converter (F/V converter) 12 converts the frequency of the pulses from the pulse generator 11 into a voltage corresponding to the frequency. An adder 10 receives the section speed reference voltage $V_{DRH}$ at one of its positive inputs and the output from the F/V converter 12 at its negative input. An integrator in the form of an operational amplifier 13 integrates the output of the adder 10. A thyristor-type power supply device 14 is energized by an A.C. power through a circuit breaker 15 and an A.C. reactor 16, and is controlled by the output of the amplifier 13 to adjust the input of the motor 9 to control the speed of the motor 9 in accordance with the output of the amplifier 13.

Among the members described above, the section speed reference setting device 8, the speed detector 11, the frequency-voltage converter 12, the amplifier 13, and the power supply device 14 form an analog part of the control system.

Additionally, a digital part of the control system is provided, which includes a common part 21 and a plurality of parts 31, each associated with each section.

The common part 21 is common to all the sections, and includes an analog-to-digital converter (A/D converter) 22 for converting the analog output $U_{MRH}$ from the line speed reference setting device 2 into a corresponding digital quantity $f_{MRH}$, and a constant-frequency oscillator 22, such as a quartz oscillator, for producing pulses $f_R$ at a precise frequency, which are used as clock pulses. The output $f_{MRH}$ of the analog-to-digital converter 22 and the output $f_R$ of the oscillator 23 are distributed to each section as a factor for determining the draw deviation, as will be described later.

The part 31 associated with each section includes an analog-to-digital converter 32 for converting the analog output $V_{DRH}$ from the voltage divider 8 into a corresponding digital quantity $f_{DRH}$, which is termed as a digital draw reference, and a counter 33 for counting the number of pulses from the pulse generator 11 to produce a signal $f_f$ indicative of the actual section speed.

A draw deviation calculation circuit 34 receives the output $f_{MRH}$ from the A/D converter 22, the output $f_{DRH}$ from the A/D converter 32, and the output $f_f$ from the counter 33 and performs an operation:

$$f_D = (f_{DRH} - f_f)/f_{MRH}(\%)$$

to obtain a draw deviation $f_D$. A digital-to-analog converter 35 converts the output $f_D$ from the draw deviation calculation device 34 into a corresponding analog quantity, which is then integrated by an operational amplifier 36 to produce a correction quantity which is fed to another positive input of the adder 10. Thus, the speed of the motor 9 of each section and hence the draw are precisely controlled.

A draw monitoring device 41 enables monitoring of the draws. An input selecting circuit 42 receives the frequency signals $N_f$ from the pulse generators 11 of all the sections, and permits selection of the two frequency signals $N_f$. A pair of counters 43 count the number of pulses of the selected frequency signals $N_f$. A draw calculation circuit 44 receives the outputs from the counters and calculates the draw between the selected sections. The output selecting circuit 45 is related with the input selecting circuit 42 and its outputs are connected to indicators 46 associated with the respective sections. Thus, the output selecting circuit 45 selects the indicator 46 corresponding to the sections selected by the input selecting circuit 42.

The above-mentioned control system has been used in a continuous processing line such as a paper making machine in which the draw must be precisely controlled. But, the control system has the following disadvantages:

First, the constant-voltage power source 1, the voltage divider 2, and the voltage dividers 8 are required, so that the control system is not sufficiently reliable in certain applications, and the control system is relatively bulky and costly.

Secondly, the digital part 31 of the control system is separately provided, so that a large number of printed circuit boards are required. This is another reason that the control system is bulky and costly. This is especially problematical since the recent trend is toward a larger number of sections of the continuous processing line.

Also, a draw monitoring device is provided separately from the digital part 31 of the control system. As a result, a large number of interconnecting cables are necessary, which also increases the cost of the control system.

Furthermore, the voltage dividers 2 and 8 have mechanical contacts which are subject to deterioration of the contacting surfaces.

Moreover, a draw setting has to be made for each of the sections. As a result, when an operator changes the draw of one section, he also has to manually adjust the draws of the successive sections.

Accordingly, as mentioned earlier, the present invention aims to improve the reliability of the control and reduce the size of the apparatus used for carrying out the control.

Figure 2:
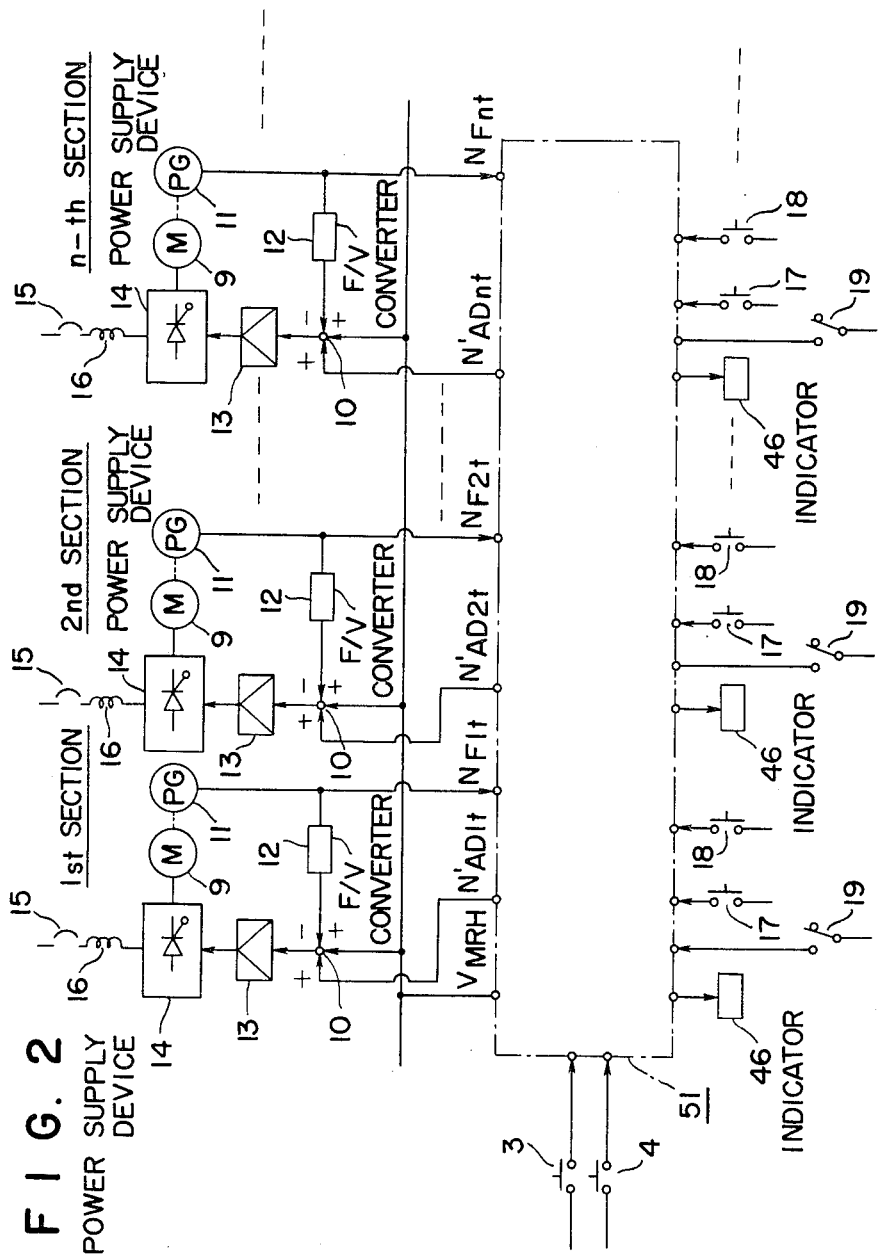
FIG. 2 is a block diagram showing a speed control system according to the invention.

FIG. 2 shows an embodiment of a motor speed control system according to the invention. The numerals 9, and 11 through 16 designate the same components as in FIG. 1. The adder 10 is also similar to that shown in FIG. 1, but inputs to it are partly different. The adder 10 (of the n-th section, as an example) receives a line speed reference signal $V_{MRH}$ supplied from a computer 51, which will be described later, and an n-th section's draw signal $N'_{ADnt}$, also supplied from the computer, at its respective positive inputs. The adder 10 also receives, at its negative input, the output of the F/V converter 12.

A line speed reference is initially set at a value of zero, and the set value is stored in a memory device. A line speed increase push button switch 3, and a line speed decrease push button switch 4 are similar to those shown in FIG. 1, but they are connected to the computer 51. The push button switch 3 or 4 is pressed when it is desired to vary the line speed set value. The computer 51 checks, at a predetermined established scan period $t_1$, whether the button switch 3 or 4 is pressed. The scan period $t_1$ is the minimum required time determined by the speed of operation of the computer 51, and is also called a unit operation time. If it is confirmed that the button switch 3 or 4 is pressed, i.e., if the output signal from the button switch 3 or 4 is inputted to the computer 51, a unit variation $\Delta V$ (m/min) of the line speed corresponding to the unit operation time $t_1$ is added to (when the button switch 3 is pressed) or subtracted from (when the button switch 4 is pressed) the stored set value of the line speed. Such operation is repeated or continued as long as the button switch 3 or 4 is pressed. Accordingly, the variation corresponds to the length of time for which the button switch 3 or 4 is pressed. The computer 51 in effect measures the time for which the button switch 3 or 4 is pressed and calculates the corresponding increment or decrement of the line speed to be made. As a result, the new set value V of the line speed is given by:

$$V = \pm(T_1/t_1)\Delta V + V_o(\text{m/min}) \qquad (1)$$

where the signs "+" and "−" are respectively for increment and decrement, and $T_1$ represents the time for which the button switch is kept pressed, and $V_o$ the old, or previously stored set value of the line speed. The set value V of the line speed is converted to an analog value $V_{MRH}$ and is outputted from the computer 51.

Speed differences or draws of the respective sections are initially set at a value of zero and the set values are stored in a memory device. A draw increase push button switch 17 and a draw decrease push button switch 18 are provided for each section, and are connected to the computer 51. The push button switch 17 or 18 is pressed when it is desired to vary the draw set value. When the draw increase/decrease operation is in "the independent mode", the computer 51 checks, at the scan interval $t_1$, whether the button switch 17 or 18 is pressed. If it is confirmed that the button switch 17 or 18 is pressed, unit variation $\Delta D$ (%) of the draw corresponding to the unit operation time $t_1$ is added to (when the button switch 17 is pressed) or subtracted from (when the button switch 18 is pressed) the stored set value of the draw. Such operation is repeated or continued as long as the button switch 17 or 18 is pressed. The computer 51 in effect measures the time for which the button switch 17 or 18 is pressed and calculates the corresponding increment or decrement of the draw to be made. As a result, the new set value $D_n$ of the draw of the n-th section, for instance, is given by:

$$D_n = \pm(T_2/t_1)\Delta D + D_{no}(\%) \qquad (2)$$

where the signs "+" and "−" are respectively for increment and decrement, and $T_2$ represents the time for which the button switch is kept pressed and $D_{no}$ the old, or previously stored set value of the draw.

The speed difference $N_{Dn}$ corresponding to the set value $D_n$ of the draw is calculated by:

$$N_{Dn} = V \cdot (D_n/100) \, (\text{m/min}) \tag{3}$$

The calculated $N_{Dn}$ is converted to an analog value $N_{ADn}$ and is sent out from the computer 51 to be applied to the adder 10 until control using the result of the first sampling of the actual section speed is commenced.

When the increase/decrease operation is in "the correlated mode", operation for varying the set value of the draw of the n-th section automatically causes variation of the set values of the draws of the successive sections. The set value $D_{n+i}$ of the draw of the (n+i)-th section ($i=1 \sim (N-n)$; N-th section being the last section) is given by:

$$D_{n+i} = \pm (T_2/t_1)\Delta D + D_{(n+i)o} \, (\%) \tag{4}$$

where the signs "+" and "−" are for increment and decrement of the draw, and $T_2$ represents the time for which the button switch 17 or 18 of the n-th section is kept pressed and $D_{(n+i)o}$ the previously stored set value of the draw of the (n+i)-th section.

The speed difference $N_{D(n+i)}$ corresponding to the set value $D_{n+i}$ of the draw is calculated by:

$$N_{D(n+i)} = V \cdot (D_{n+i}/100) \, (\text{m/min}) \tag{5}$$

The set value $D_n$ of the draw of the n-th section and the speed difference $N_{Dn}$ corresponding to the set value $D_n$ are calculated by the equations identical to those (2) and (3) used in "the independent mode".

The calculated $N_{Dn}$ and $N_{D(n+i)}$ are converted to analog values $N_{ADn}$ and $N_{AD(n+i)}$ and outputted from the computer 51.

When the set value of the draw is varied, the speed reference for the draw control of each section is given as $(V_{MRH} + V_{ADn})$ as obtained in a manner described above. After first sampling of the actual section speed is made, the detected actual section speed is also taken account of.

The computer 51 counts the number of pulses from the pulse generator 11 at a predetermined interval or sampling period $t_2$. The result of the count $N_{Fnt}$ represents the detected value of the section speed. The computer 51 calculates the deviation $\Delta N_t$ of the detected section speed $N_{Fnt}$ from the section speed set value, which is the sum of the stored line speed set value V and the stored speed difference $N_{Dn}$ corresponding to the draw set value, i.e., it performs the following calculation:

$$\Delta N_t = (V + N_{Dn}) - N_{Fnt} \tag{6}$$

At the time of the previous scan, similar calculation was performed on the detected section speed $N_{Fn(t-1)}$:

$$\Delta N_{t-1} = (V + N_{Dn}) - N_{Fn(t-1)} \tag{7}$$

to find the deviation $\Delta N_{t-1}$.

Subsequently, the deviations $\Delta N_t$ and $\Delta N_{t-1}$ and the speed difference $N_{Dn}$ corresponding to the draw set value is added:

$$N'_{Dnt} = \Delta N_t + \Delta N_{t-1} + N_{Dn} \tag{8}$$

The result of the calculation (8) stands for "the speed difference corresponding to the draw set value plus the correction" $N'_{Dnt}$, which is then converted to an analog value $N'_{ADnt}$ and outputted from the computer 51. $N'_{ADnt}$ is added to $V_{MRH}$ and the sum is used as the speed reference of the section n for speed control of the motor of the section n at the sampling time t. More particularly, the detected actual section speed is subtracted from the above-mentioned sum, and the speed of the motor is controlled in accordance with the difference calculated by the above-mentioned subtraction.

A similar operation is repeated with respect to all the sections every sampling period $t_2$, to achieve digital speed control.

While the button switch 3 or 4 is pressed $N'_{ADnt}$ is not produced with respect to all the sections. While the button switch 17 or 18 is pressed $N'_{ADnt}$ is not produced with respect to the relevant section.

Indicators 46 similar to those shown in FIG. 1 are provided, but they are connected to the computer 51. The detected section speed $N_{Fnt}$ is obtained every sampling period $t_2$, so that the draw of each section is readily obtained and indicated by means of the indicater 46.

An independent/correlated operation selecting switch 19 is provided for each section and is connected to the computer 51 to permit selection between the independent and correlated modes.

Figure 3B:
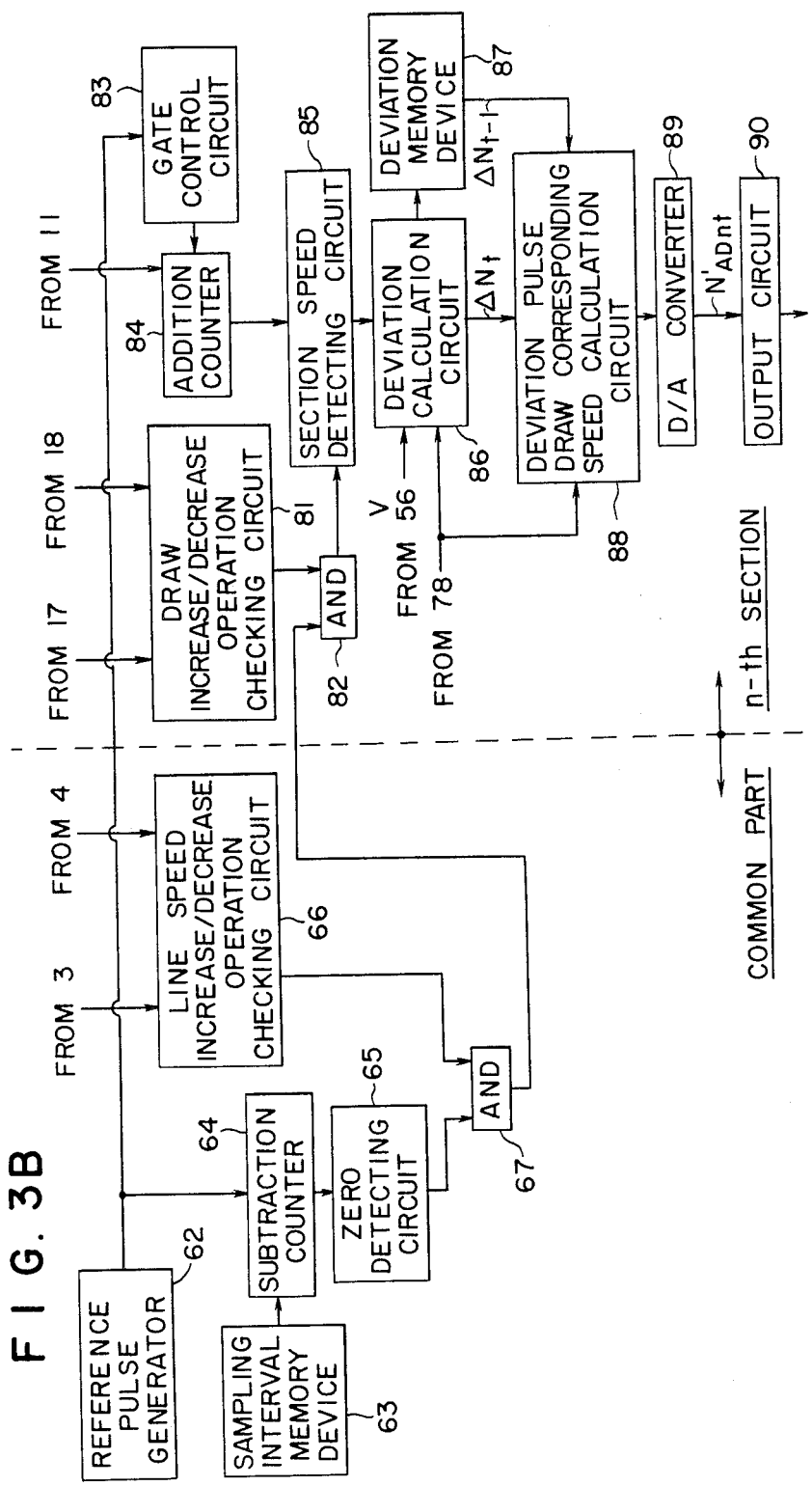

In FIGS. 3A and 3B, internal circuitry of the computer 51 is shown in the form capable of performing parallel processing. In both FIGS. 3A and 3B, circuits common to all the sections and circuit specifically related to the n-th section are illustrated. Circuits specifically related to the other sections are identical to that specifically related to the n-th section.

A scan pulse generator 52 provides pulses at $t_1$. An AND gate 53 receives the pulses from the pulse generator 52 and the signal from the button switch 3, and produces the logical product of the inputs. Similarly, an AND gate 54 receives the pulses from the pulse generator 52 and the signal from the button switch 4, and produces the logical product of the inputs. Thus the AND gates 53 and 54 in effect check, every scan period $t_1$, whether the button switch 3 or 4 is pressed. The AND gate transfers the pulses as long as the button switch 3 is pressed. Similarly, the AND gate 54 transfers the pulses as long as the button switch 4 is pressed. Accordingly, the number of the pulses through the AND gate 53 or 54 corresponds to the length of time $T_1$ for which the button switch 3 or 4 is kept pressed, divided by the unit operation time $t_1$.

A line speed read out circuit 55 is triggered by any of the outputs of the AND gates 53 and 54, and reads out the line speed stored in a line speed memory device 56. An addition circuit 57 adds a unit variation every time a pulse is supplied through the AND gate 53, to the output of the line speed read out circuit 55, and repeats such operation as long as the pulses are transferred through the AND gate 53. Thus, the addition circuit 57 in effect adds the desired increment of the line speed to the previously stored line speed. Similarly, a subtraction circuit 58 subtracts a unit variation every time a pulse is supplied through the AND gate 54 from the output of the line speed read out circuit 55, and repeats such operation as long as the pulses are transferred through the AND gate 54. Thus, the subtraction circuit 58 in effect subtracts the desired decrement of the line speed from the previously stored line speed.

The line speed memory device 56 stores the output of the addition circuit 57 or the subtraction circuit 58 in place of the previously stored line speed. Thus the line speed set value V is revised to the value as given by the equation (1).

A line speed reference voltage calculation circuit 59 receives the line speed V as stored in the memory device 56, and produces a line speed reference voltage, in digital form, whose value is proportional to the line speed V. A digital-to-analog converter 60 converts the digital input into a line speed reference voltage $V_{MRH}$ in analog form, which is then outputted through an output circuit 61. The line speed reference voltage $V_{MRH}$ is distributed to the adders 10 (FIG. 2) of all the sections.

An AND gate 71 produces a logical product of the output from the pulse generator 52 and the output from the button switch 17. Another AND gate produces a logical product of the output from the pulse generator 52 and the output from the button switch 18. Thus the AND gates 71 and 72 check, at the scan period $t_1$, whether the button switch 17 or 18 is pressed. The AND gate 71 transfers the reference pulses as long as the button switch 17 is pressed. Similarly, the AND gate 72 transfers the reference pulses as long as the button switch 18 is pressed. Accordingly, the number of the pulses through the AND gate 71 or 72 corresponds to the length of time $T_2$ for which the button switch 17 or 18 is kept pressed, divided by the unit operation time $t_1$.

A draw read out circuit 73 is triggered by any of the outputs of the AND gates 71 and 72, and reads out the draw stored in a draw memory device 74. An addition circuit 75 adds a unit variation every time a pulse is supplied through the AND gate 71 to the output of the draw speed read out circuit 73, and repeats such operation as long as the pulses are transferred through the AND gate 71. Thus, the addition circuit 75 adds the desired increment of the section speed to the previously stored draw. Similarly, a subtraction circuit 76 subtracts a unit variation every time a pulse is supplied through the AND gate 72 from the output of the draw read out circuit 73, and repeats such operation as long as the pulses are transferred through the AND gate 72. Thus, the subtraction circuit 76 subtracts the desired decrement of the section speed from the previously stored draw.

The draw memory device 74 stores the output of the addition circuit 75 or the subtraction circuit 76 in place of the previously stored draw. Thus the draw set value is revised to the value as given by the equation (2).

A set draw corresponding speed calculation circuit 77 receives the output $D_n$ of the draw memory device 74 and the output V of the line speed memory device 56 and performs an operation of the equation (3) to obtain the set draw corresponding speed $N_{Dn}$.

A set draw corresponding speed memory device 78 stores the set draw corresponding speed $N_{Dn}$ as calculated by the circuit 77.

A digital-to-analog converter 79 converts the set draw corresponding speed $N_{Dn}$ into an analog value $N_{ADn}$, which is then sent out through an output circuit 80.

In FIG. 3B, a reference pulse generator 62 provides pulses at a predetermined interval. A sampling interval memory device 63 stores a sampling interval $t_2$ at which sampling is to be repeated. A subtraction counter 64 subtracts the number of pulses from the stored sampling interval $t_2$. A zero detecting circuit 65 produces a signal "1" when the result of the subtraction at the counter 64 becomes "zero". A line speed increase/decrease operation checking circuit 66 detects the states of the button switches 3 and 4, and produces a signal "1" when neither of the switches 3 and 4 is being pressed. An AND gate 67 produces the logical product of the output of the zero-detecting circuit 65 and the output of the line speed operation checking circuit 66.

A draw increase/decrease operation checking circuit 81 detects the states of the push button switches 17 and 18, and produces a signal "1" when neither of the switches 17 and 18 is being pressed. An AND gate 82 produces the logical product of the output of the draw increase/decrease operation checking circuit 81 and the output of the AND gate 67.

A gate control circuit 83 receives the pulses from the reference pulse generator 62, and controls a gate time $t_2$ during which the gate circuit of an addition counter 84 is open. The addition counter 84 counts the number of the pulses from the pulse generator 11 (FIG. 2) which is transferred while the gate of the addition counter 84 is open. As a result of the count, a detected value $N_{Fnt}$ of the section speed is obtained.

A section speed detecting circuit 85 receives the detected section speed $N_{Fnt}$ provided that the output of the AND gate 82 is "1".

A deviation calculation circuit 86 receives the detected section speed $N_{Fnt}$ from the section speed detecting circuit 85, the line speed V stored in the memory device 56 (FIG. 3A) and the set draw corresponding speed $N_{Dn}$ stored in the memory device 87, and performs the operation of the equation (6) to obtain the deviation $\Delta N_t$.

Such calculation is performed upon each sampling time, and the deviation $\Delta N_{t-1}$ at the time of the preceding sampling is calculated by the equation (7). The deviation $\Delta N_{t-1}$ at the preceding sampling has been stored in the deviation memory device 87.

A set draw plus correction calculation circuit 88 is supplied with the deviation $\Delta N_t$ as calculated by the calculation circuit 86, the deviation $\Delta N_{t-1}$ as stored in the memory device 87 and the set draw corresponding speed $N_{Dn}$ stored in the memory device 87, and performs the operation of the equation (8) to obtain a set draw corresponding speed plus correction $N'_{Dnt}$.

A digital-to-analog converter 89 converts the set draw corresponding speed plus correction $N'_{Dnt}$ into an analog value $N'_{ADnt}$, which is then sent through an output circuit 90. This value $N'_{ADnt}$ is fed to a positive input of the adder 10 (FIG. 2).

Figure 4A:
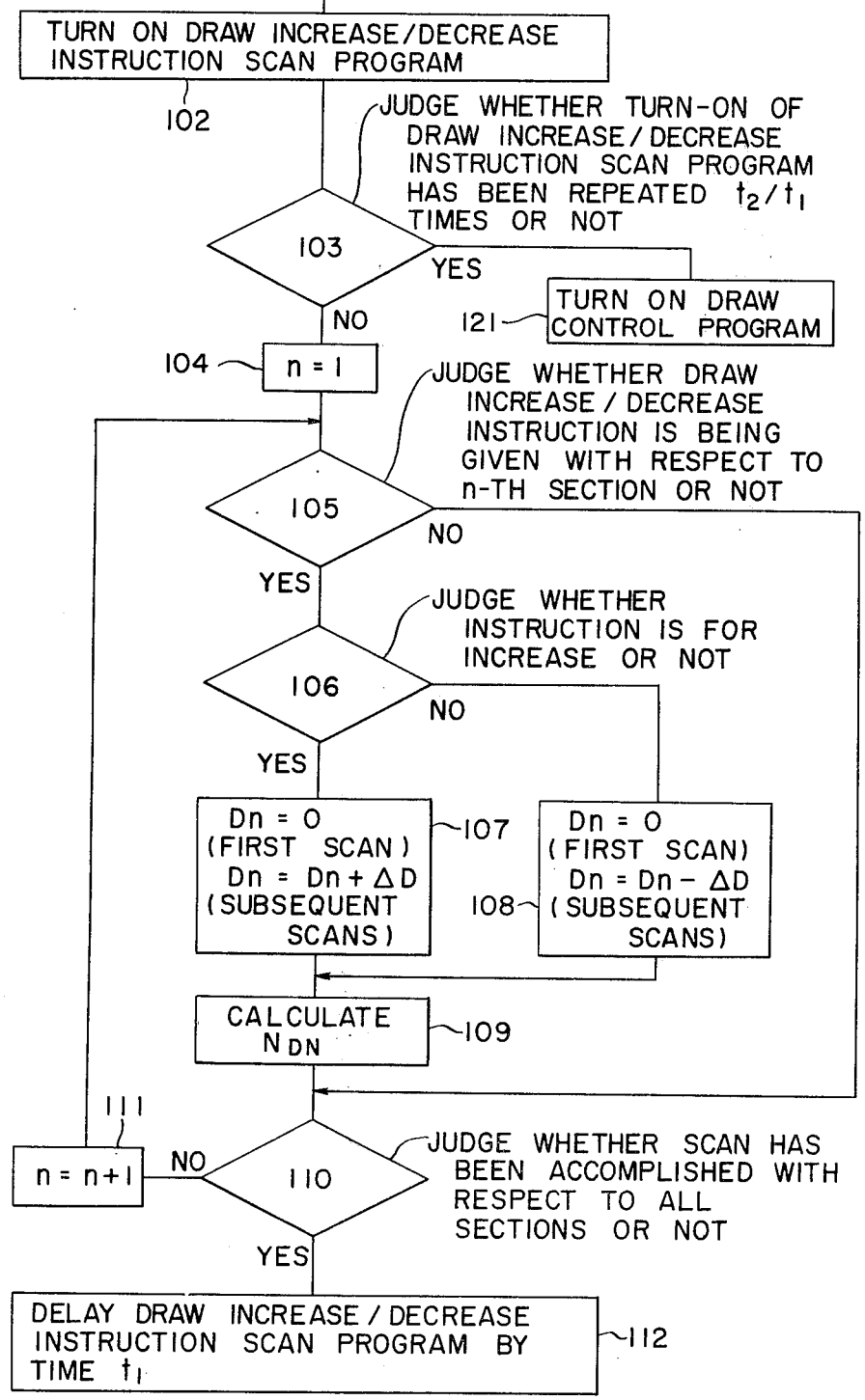
Figure 4B:
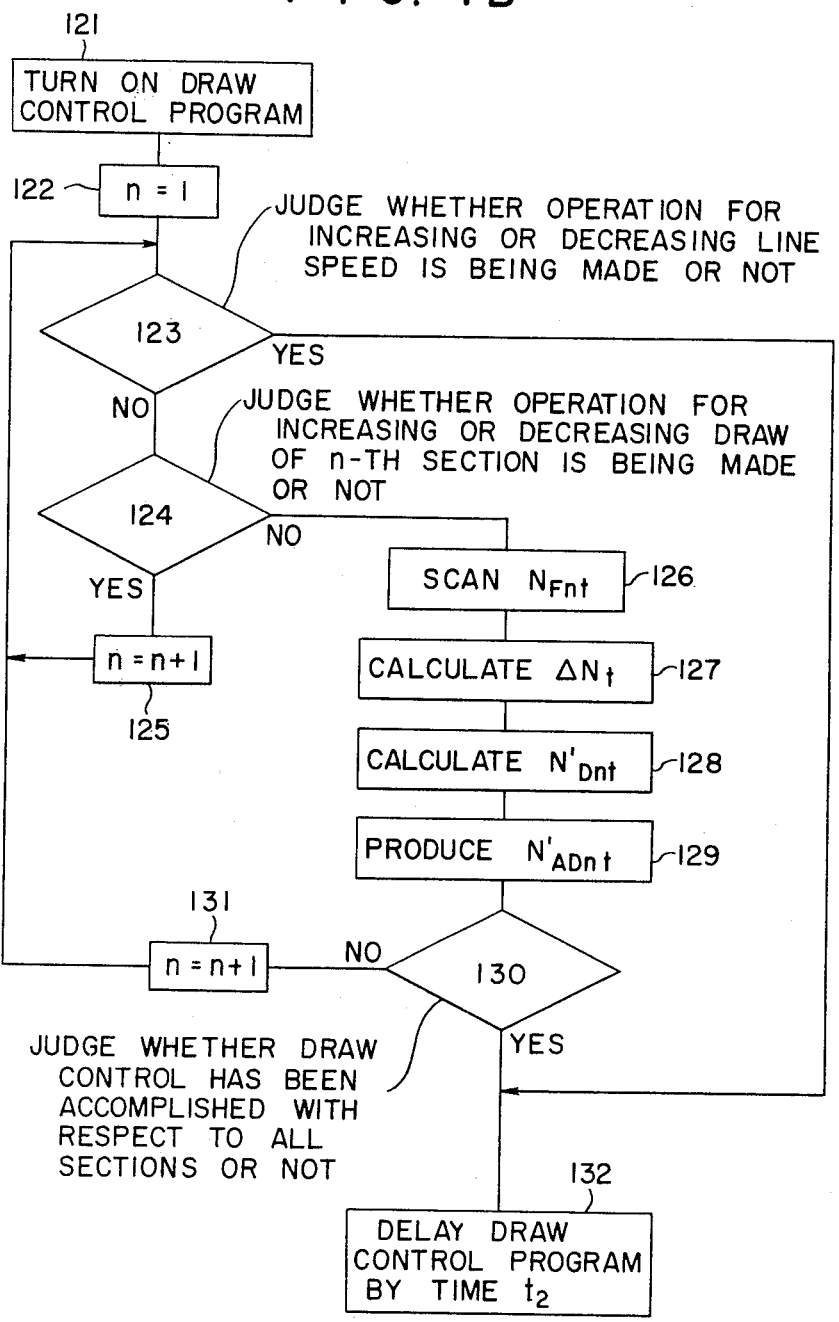

FIGS. 4A and 4B are flow charts illustrating the operation in which serial processing is performed for controlling the draws of a plurality of sections.

As the computer 51 is started (101), production of scan pulses at the interval $t_1$ is commenced, and each time the scan pulse is generated a draw increase or decrease operation program is turned on (102). Then it is judged whether turn-on of the draw increase/decrease scan program has been repeated $t_2/t_1$ times (103). If the answer at the step 103 is "No" the procedure is advanced to the step 104 where the section number "n" is set to 1, so that the increase/decrease operation of the draw is commenced from the first section. Subsequently, it is judged whether draw a increase or decrease instruction is given (105). If the answer is "No" the procedure proceeds to the step 110, which will be described later. If the answer is "Yes", it is next judged whether the instruction is for an increase (106). If the answer is "Yes" the procedure goes to the step 107 where $D_n$ is set to zero at the first scan after the start of the computer 51. At the second and later scans, unit variation $\Delta D$ is added to the previously stored draw $D_n$. If the answer at the step 106 is "No" the procedure goes to the step 108 where $D_n$ is set to zero at the first scan and $\Delta D$ is subtracted from the previously stored $D_n$ at the subsequent scans. When the step 107 or 108 is completed, then the draw corresponding speed $N_{Dn}$ is calculated, at the step 109, in accordance with the equation (3). At the step 110, it is judged whether scan has been completed with respect to all the sections. If the answer is "No", the stored section number n is increased by one (111). Then the procedure goes back to the step 105, and the steps 105-110 are repeated until the scan has been accomplished with respect to all the sections. When the answer at the step 110 is "Yes", the procedure is advanced to the step 112 where the draw increase/decrease instruction scan program is delayed by time $t_1$.

When the draw increase/decrease instruction scan program is repeated $t_2/t_1$ times, this is detected at the step 103 and the procedure goes to the step 121 where draw control program is turned on. At the step 122, the stored section number n is set to one. Then it is judged whether operation for increasing or decreasing the set line speed is being made (123). If the answer is "Yes" the procedure goes to the step 132 which will be described later. If the answer is "No" it is then judged whether operation for increasing or decreasing the set draw of the n-th section is being made (124). If the answer is "Yes" the stored section number n is increased by one (125) and the procedure goes back to the step 123. If the answer at the step 124 is "No" the detected section speed $N_{Fnt}$ is scanned (126). Then, at the step 127, the deviation $\Delta N_t$ is calculated in accordance with the equation (6). Subsequently, at the step 128, the set draw plus correction $N'_{Dnt}$ is calculated in accordance with the equation (8). Then the calculated $N'_{Dnt}$ is outputted (129), and it is judged whether draw control has been accomplished with respect to all the sections (130). If the answer is "No", the stored section number n is increased by one (131). If the answer is "Yes", the draw control program is delayed by time $t_2$.

In the embodiment described above, the digital values $N_{Dn}$ and $N'_{Dnt}$ are converted into analog values before they are sent out. However, the digital values $N_{Dn}$ and $N'_{Dnt}$ may be sent out from the computer 51 and used to form a reference value of the section speed.

In place of the push button switches 3, 4, 17 and 18, manually operable switches of any other type may be used.

In the embodiment described above, the scan pulse is produced irrespective as to whether the button switch 3 or 4, or 17 or 18 is pressed. It should however be noted that the arrangement may alternatively be such that the scan pulse is produced only when the button switch 3 or 4, or 17 or 18 is pressed.

What is claimed is:

1. In a speed control method for digitally controlling the speeds of a plurality of motors provided in respective sections and operating in correlation with each other to form an operating line having an operating line speed, including the steps of:
   (a) setting a line speed reference,
   (b) establishing a predetermined sampling period,
   (c) providing a speed difference set value for each section with respect to the line speed reference,
   (d) detecting at every predetermined sampling period, the actual section speed of each section,
   (e) calculating for each section a speed deviation in accordance with the line speed reference, the speed difference set value for the section, and the actual section speed for the section, and
   (f) controlling the speed of the motor of each section in accordance with the speed deviation calculated for each section in step (e);

the improvement wherein said step (c) of providing a speed difference set value comprises the steps of:
   ($b_1$) establishing a unit operation time period,
   ($b_2$) operating a first manually operable switch to vary the speed difference set value of each section, and
   ($b_3$) varying the speed difference set value for a section by a unit value for each unit operational time period which occurs during the manual operation of said first switch.

2. A speed control method according to claim 1, wherein said step ($b_3$) of varying the speed difference set value comprises the steps of:
   checking, at each said unit operation time period, whether the manually operable first switch is operated, and
   varying the speed difference set value by the unit value if it is found, as a result of the check, that the manually operable first switch is operated.

3. A speed control method according to claim 1 or 2, wherein said step (a) of setting the line speed reference comprises the steps of:
   ($a_1$) operating a manually operable second switch to vary the line speed reference, and
   ($a_2$) varying the line speed reference by a unit value for each unit operation time period which occurs during manual operation of said second switch.

4. A speed control method according to claim 3, wherein said step ($a_2$) of varying the line speed reference comprises the steps of:
   checking, at each said unit operation time period, whether the manually operable second switch is operated, and
   varying the line speed reference by the unit value if it is found, as a result of the check, that the manually operable second switch is operated.

5. A speed control method according to claim 1, wherein said step (e) of calculating a deviation comprises the steps of:
   ($e_1$) calculating, during every sampling period, a deviation of the actual section speed from the sum of the line speed reference and the speed difference set value,
   ($e_2$) calculating, during every sampling period, the sum of the deviation calculated at said step ($e_1$) in the present sampling period, the deviation calculated at said step ($e_1$) in the preceding sampling period, and the speed difference set value, and
   ($e_3$) subtracting the actual section speed from the sum of the line speed reference and the sum calculated at said step ($e_2$).

* * * * *